Patented Sept. 26, 1933

1,927,912

UNITED STATES PATENT OFFICE 1,927,912

METAL WELDING

Calvin P. Bassett, Maryville, Tenn.

No Drawing. Application December 19, 1930
Serial No. 503,607

6 Claims. (Cl. 219—10)

This invention relates to the art of metal welding, and has for its object to obtain a perfect and unoxidized weld in connection with ferrous articles in a simple, efficient and inexpensive manner, and involves the preparing of the surface of the ferrous metal against being oxidized under the welding heat to which the metal article may be subjected during the operation of welding, and to obtain at the same time an eminently satisfactory bond between the metals thus welded.

In carrying out the invention, according to one aspect thereof for the purpose of providing wear resisting parts, a thin chromium coating is electrolytically deposited upon the ferrous article or metal in any preferred or well known manner, which can, of course, be done without oxidizing the surface of the ferrous metal or article as will be readily understood. Then the chromium-alloy is welded upon the electroplated ferrous metal or article. The initial electroplated coating of chromium protects the ferrous article against oxidation as would otherwise occur by reason of the relatively high temperature employed in welding the chromium-alloy onto the ferrous metal.

A specific manner of applying the chromium-alloy metal is to bring a welding arc and a chromium-alloy pencil into close proximity with the chromium plated surface of the ferrous metal, and then to effect relative movements therebetween so as to spread or run the chromium-alloy as it melts over the electroplated surface of the ferrous metal or article, which can be done without oxidizing or otherwise impairing the surface of the ferrous metal to any appreciable extent due to the protection afforded by the electroplated coating.

The surface of the ferrous metal is prepared in the usual manner for electroplating, but it is not necessary to prepare the electroplated surface preparatory to welding the chromium-alloy thereto.

While the present invention, as thus far described, is capable of a wide range of use, it is particularly designed for providing mechanical parts in a cheap and efficient manner and with, at least, a part of the surface highly resistant to wear, such as for use in knitting machines, where certain parts are subject to the rapid reciprocation of the needles and thus subject to heavy wear. Another instance of the useful application of this invention is in the application of chromium-alloy to the working surface of dies and punches, where it is very valuable because of its hardness and wear resisting qualities.

It has been found that the present invention provides mechanical parts cheaply which effectually withstand the wear to which they are subject and thus materially prolong the life of such parts.

The function of the initial and very thin electroplated chromium coating is to protect the surface of the ferrous metal against the oxidizing effect of the heat and adjacent gases incident to the melting of chromium-alloy and the welding thereof upon the ferrous metal, and in practice it has been noted that the electrolytically deposited chromium does not seem to remain in place on the ferrous metal or article, but passes through and comes to the outer surface of the welded chromium-alloy.

While I have described the use of arc welding for applying the welded coating, it is of course apparent that torch welding or any other form of welding may be employed without departing from the spirit of the present invention.

According to another aspect of the invention, ferrous articles or pieces of ferrous metal may be welded together by first electrolytically depositing a thin coating of chromium-alloy upon each piece of ferrous metal, which of course can be done without oxidizing the surface of the article or the piece of metal, and then welding together the coated faces of the chromium-coated pieces of ferrous metal. The electroplated coating of chromium protects the ferrous articles against oxidation, as would otherwise occur by reason of the high temperature employed in welding together the chromium coated pieces of ferrous metal.

From the foregoing description, it will be understood that applicant's invention is designed not only to provide a wear resisting coating which is welded to a ferrous article or part, but is also designed to provide for effectively welding together ferrous metal parts or articles without any danger of the joint between the metals or the surrounding areas becoming oxidized or otherwise impaired.

What I claim is:

1. The herein described method which consists in electrolytically depositing a coating of chromium upon a ferrous article, and then melting and welding a chromium-alloy upon the electrolytically deposited coating.

2. The herein described method which consists in electroplating the surface of a ferrous article with a metal such as will protect the ferrous surface against oxidizing under a welding heat, and then melting and welding a chromium-alloy upon the electroplated surface of the article.

3. The herein described method of providing a ferrous article with a wear resisting surface, which consists in electroplating the surface of the article with a metal such as will protect the ferrous surface against oxidizing under a welding heat, and then melting and welding a wear resisting alloy upon the electroplated surface of the article.

4. The herein described method of providing a ferrous article with a wear resisting surface, which consists in electroplating the surface of a ferrous article with chromium, and then melting and welding a chromium-alloy upon the uncleaned and unprepared electroplated surface of the article.

5. The herein described method of providing a ferrous article with a wear resisting surface, which consists in electro-plating the surface of the article with a metal such as will protect the ferrous surface against oxidizing under welding heat, then bringing a welding arc and a metallic pencil into close proximity with the plated surface of the ferrous metal, and then effecting relative movement between the plated article and the pencil so as to spread or run the melting portion of the pencil over the electro-plated surface of the ferrous metal article.

6. The herein described method of providing a ferrous article with a wear resisting surface, which consists in electrolytically depositing a thin chromium coating upon the ferrous article, then bringing a welding arc and a chromium alloyed pencil into close proximity with the chromium-plated surface of the ferrous article, and then effecting relative movement therebetween so as to spread the chromium alloy as it melts over the electro-plated surface of the ferrous article.

CALVIN P. BASSETT.